United States Patent
Defayet et al.

(10) Patent No.: US 8,473,626 B2
(45) Date of Patent: Jun. 25, 2013

(54) METHOD AND SYSTEM FOR PROVIDING A SESSION IN A HETEROGENEOUS ENVIRONMENT

(75) Inventors: Christophe Defayet, Grasse (FR); Simon Martin, Antibes (FR); Stéphane Monbel, Nice (FR)

(73) Assignee: Amadeus S.A.S., Sophia Antipolis (FR)

( * ) Notice: Subject to any disclaimer, the term of this patent is extended or adjusted under 35 U.S.C. 154(b) by 20 days.

(21) Appl. No.: 13/065,273

(22) Filed: Mar. 18, 2011

(65) Prior Publication Data

US 2012/0239818 A1    Sep. 20, 2012

(30) Foreign Application Priority Data

Mar. 15, 2011    (EP) .................................... 11305280

(51) Int. Cl.
    *G06F 15/16* (2006.01)
(52) U.S. Cl.
    USPC ............................ 709/228; 709/227; 709/229
(58) Field of Classification Search
    USPC ................. 709/228, 227, 229, 204, 206, 224,
        709/222; 370/252, 352, 401, 329, 463;
        379/93.02, 202.01; 725/38; 713/182; 455/414.1
    See application file for complete search history.

(56) References Cited

U.S. PATENT DOCUMENTS

| | | | |
|---|---|---|---|
| 6,208,955 B1 | 3/2001 | Provan et al. | |
| 6,392,997 B1 | 5/2002 | Chen | |
| 7,437,408 B2 | 10/2008 | Schwartz et al. | ............. 709/204 |
| 7,454,462 B2 | 11/2008 | Belfiore et al. | ................ 709/203 |
| 7,454,761 B1 | 11/2008 | Roberts et al. | ................ 719/318 |
| 7,512,652 B1 * | 3/2009 | Appelman et al. | ............ 709/204 |
| 2002/0078150 A1 * | 6/2002 | Thompson et al. | ........... 709/204 |
| 2003/0023715 A1 | 1/2003 | Reiner et al. | .................... 709/224 |
| 2003/0097285 A1 | 5/2003 | Ghaniem | |
| 2003/0177044 A1 | 9/2003 | Sokel et al. | |

(Continued)

FOREIGN PATENT DOCUMENTS

| | | |
|---|---|---|
| CN | 101187946 A | 5/2008 |
| EP | 2259217 A1 | 12/2010 |

(Continued)

OTHER PUBLICATIONS

IBM, "WebSphere Edge Server for Multiplatforms, Getting Started", Version 2.0, (Dec. 2001), (119 pages).

(Continued)

*Primary Examiner* — Le H Luu
(74) *Attorney, Agent, or Firm* — Wood, Herron & Evans, LLP

(57) ABSTRACT

Method and system for providing a user with a consistent view of user session requiring a conversation between an external device and application servers in a distributed computing environment. The conversation may be established by receiving a call at a routing device from one of the application servers or the external device to reach the other to establish communication therebetween, opening a session for the conversation, creating a session ID that uniquely identifies the session, adding the session ID to the call, storing the session ID, and routing the call to the other of the application server or the external device. If the call already includes a session ID, then the conversation may be established by routing the call to the other-of the application server or the external device, and allowing the conversation to join an already opened session that is uniquely identified by the session ID.

24 Claims, 5 Drawing Sheets

U.S. PATENT DOCUMENTS

| | | | |
|---|---|---|---|
| 2003/0195959 A1 | 10/2003 | Labadie et al. | 709/224 |
| 2003/0225888 A1* | 12/2003 | Wason | 709/227 |
| 2003/0233473 A1 | 12/2003 | Bonhomme et al. | |
| 2005/0008163 A1 | 1/2005 | Leser et al. | 380/281 |
| 2005/0108298 A1 | 5/2005 | Iyengar et al. | |
| 2005/0262100 A1 | 11/2005 | Piper | 707/10 |
| 2006/0155857 A1 | 7/2006 | Feenan, Jr. et al. | |
| 2006/0212583 A1* | 9/2006 | Beadle et al. | 709/227 |
| 2007/0110010 A1 | 5/2007 | Kotola et al. | 370/338 |
| 2007/0192492 A1 | 8/2007 | Okazaki | |
| 2007/0234417 A1 | 10/2007 | Blakley, III et al. | 726/12 |
| 2008/0028084 A1 | 1/2008 | Bloching et al. | 709/229 |
| 2008/0091480 A1 | 4/2008 | Geoghegan et al. | 705/5 |
| 2008/0126567 A1 | 5/2008 | Wilson | |
| 2008/0288644 A1 | 11/2008 | Gilfix et al. | |
| 2009/0019118 A1* | 1/2009 | Jones et al. | 709/206 |
| 2010/0220604 A1* | 9/2010 | Skog et al. | 370/252 |
| 2010/0316064 A1* | 12/2010 | Riley et al. | 370/463 |
| 2011/0082942 A1* | 4/2011 | Takei et al. | 709/227 |
| 2011/0116461 A1* | 5/2011 | Holt et al. | 370/329 |
| 2011/0149951 A1* | 6/2011 | Qiu et al. | 370/352 |
| 2011/0196824 A1 | 8/2011 | Maes | |
| 2011/0200054 A1* | 8/2011 | Craig et al. | 370/401 |
| 2011/0202956 A1* | 8/2011 | Connelly et al. | 725/38 |
| 2011/0283110 A1* | 11/2011 | Dapkus et al. | 713/182 |
| 2011/0295996 A1* | 12/2011 | Qiu et al. | 709/224 |
| 2012/0005320 A1* | 1/2012 | Sheth et al. | 709/222 |
| 2012/0042060 A1* | 2/2012 | Jackowski et al. | 709/224 |
| 2012/0069983 A1* | 3/2012 | Sall | 379/202.01 |
| 2012/0131212 A1* | 5/2012 | Tang et al. | 709/228 |
| 2012/0163571 A1* | 6/2012 | Brunson et al. | 379/93.02 |
| 2012/0173736 A1* | 7/2012 | Klein | 709/227 |
| 2012/0184254 A1* | 7/2012 | Li et al. | 455/414.1 |

FOREIGN PATENT DOCUMENTS

| | | |
|---|---|---|
| KR | 1020050006383 A | 1/2005 |
| WO | WO 99/60478 | 11/1999 |
| WO | 0063808 A1 | 10/2000 |
| WO | WO 02/19105 A1 | 3/2002 |
| WO | WO 02/29640 A1 | 4/2002 |

OTHER PUBLICATIONS

IBM, "WebSphere Application Server V6 Scalability and Performance Handboole", (May 2005), (1118 pages).

USPTO, Office Action received in U.S. Appl. No. 13/084,251 dated Apr. 10, 2013.

European Search Report for European application No. 11305278 dated Jul. 5, 2011.

European Search Report for European Application No. 11 30 5281 dated Aug. 12, 2011.

European Search Report for European Application No. 11 30 5277 dated Aug. 10, 2011.

European Patent Office, extended European search report issued in related European application No. 11305280.7 dated Jan. 17, 2012.

Keen et al., "Patterns: SOA Foundation—Business Process Management Scenario", Sections 2.2, 2.3, 5.1-5.3, 7.1-7.4, ibm.com/redbooks, pp. 1-523 (Aug. 1, 2006).

Sadtler et al., "Patterns: Broker Interactions for Intra- and Inter-enterprise," Sections 3.3-3.5, 4.1-4.3, 5.1-5.3, 6.1-6.3, 9.1-9.6, ibm.com/redbooks, pp. 1-303 (Jan. 1, 2004).

* cited by examiner

METHOD AND SYSTEM FOR PROVIDING A SESSION IN A HETEROGENEOUS ENVIRONMENT

TECHNICAL FIELD

The present invention relates generally to system and method of providing an external device with a session in a distributed computerized environment, wherein the session requires establishing conversations between the external device and the system operating in a client/server mode. More particularly, the invention relates to methods and systems wherein possibly very heterogeneous conversations have to share a common session.

BACKGROUND

Many existing systems are configured to provide an external device with a session comprising various conversations between software applications of the system and the external device and wherein the external device and the system operate in a client/server mode.

These existing solutions have turn out to be efficient for homogenous environments, i.e, environments wherein the software applications involved in a session use a common protocol.

However, with these existing systems it is particularly difficult to have conversations using different protocols while sharing a common context for the entire session. Most often, the context for a given session must be duplicated for each protocol used by the involved application servers. Such existing solutions consume processing and data storage capabilities. In particular existing systems do not provide efficient solutions to migrate gradually from applications using given protocols to applications using other protocols while sharing the same context.

Additionally, independently of the protocols used by the conversations, when the external device operates in a server mode in regard to the system operating in a client mode, and when the system comprises a number of application servers, it is particularly complex to have all conversations sharing a common session. In existing solutions the system is provided with a dedicated application server configured to merge the queries from the system into the same outbound conversation with the external device. However, these dedicated application servers undergo an important load which decreases the throughput of these existing systems or renders them poorly reliable or complex.

Therefore, a general objective of the present invention is to solve or to limit at least one of the above mentioned shortcomings of the existing solutions.

More particularly, an objective of the present invention is to describe a solution wherein an external device is provided with a unified view of a session comprising heterogeneous conversations that must share a common context.

SUMMARY

The foregoing and other objectives are overcome, and other advantages are realized, in accordance with the embodiments of this invention.

The present invention discloses a method of providing an external device with a session, wherein the session requires establishing conversations between the external device and application servers of a system. The external device and the system operate in a client/server mode, the system operating in one mode among the client mode and the server mode, the external device operating in the other mode among the client mode and the server mode.

Each application server processes at least a software application, at least some of the application servers being arranged to store in data storage means at least a part of a context of the session, allowing thereby to distribute the context through various application servers linked to the session.

The system is provided with at least a routing means configured to establish, for a given session, a conversation between the external device and one of the application servers. Establishing the conversation comprises the following steps performed at the routing means with at least one data processor:

receiving a call from one among the application server and the external device to reach the other among the application server and the external device;

determining if the call comprises a session identifier (ID),
If the call does not comprise a session ID, then opening a session for said conversation, creating a session ID that uniquely identifies said session, adding the session ID to the call, storing the session ID and routing the call to the other among the application server and the external device, establishing thereby the conversation;
If the call already comprises a session ID, then routing the call to the other among the application server and the external device and allowing said conversation to join an already opened session that is uniquely identified by said session ID, thereby establishing the conversation and enabling the conversation to share the context of an already opened session.

Another aspect of the present invention relates to a non-transitory computer-readable medium that contains software program instructions, where execution of the software program instructions by at least one data processor results in performance of operations that comprise execution of the method as in any one of the preceding features and steps.

According to another aspect, the invention relates to a system comprising means configured to execute the method as in any one of the preceding features and steps.

Another aspect of the present invention is a system for providing an external device with a session wherein the session requires establishing conversations between the external device and application servers comprised in the system, the system being configured to operate in a client/server mode with the external device. The system operates in one among the client mode and the server mode and the external device operates in the other one among the client mode and the server mode. Each application server is arranged to process at least a software application. Each application server runs on a machine. At least some of the machines are provided with data storage means. At least some of the application servers are arranged to store in data storage means at least a part of a context of the session, allowing thereby distributing the context through various application servers linked to the session.

The system comprises routing means comprising at least a data processor configured to establish the conversation between the external device and the application servers. The one or more routing means are configured to:

receive a call from one among the application server and the external device to reach the other among the application server and the external device;

determine if the call comprises a session identifier (ID),
If the call does not comprise a session ID, then opening a session for said conversation, creating a session ID that uniquely identifies said session, adding the session ID to the call and storing the session ID, routing the call to the other among the application server and the external device, establishing thereby the conversation;

If the call already comprises a session ID, then routing the call to the other among the application server and the external device and allowing said conversation to join an already opened session that is uniquely identified by said session ID, thereby establishing the conversation and enabling the conversation to share the context of said already opened session.

BRIEF DESCRIPTION OF THE DRAWINGS

The foregoing and other aspects of the embodiments of this invention are made more evident in the following Detailed Description, when read in conjunction with the attached Drawing Figures, wherein.

DETAILED DESCRIPTION

Figure 1:
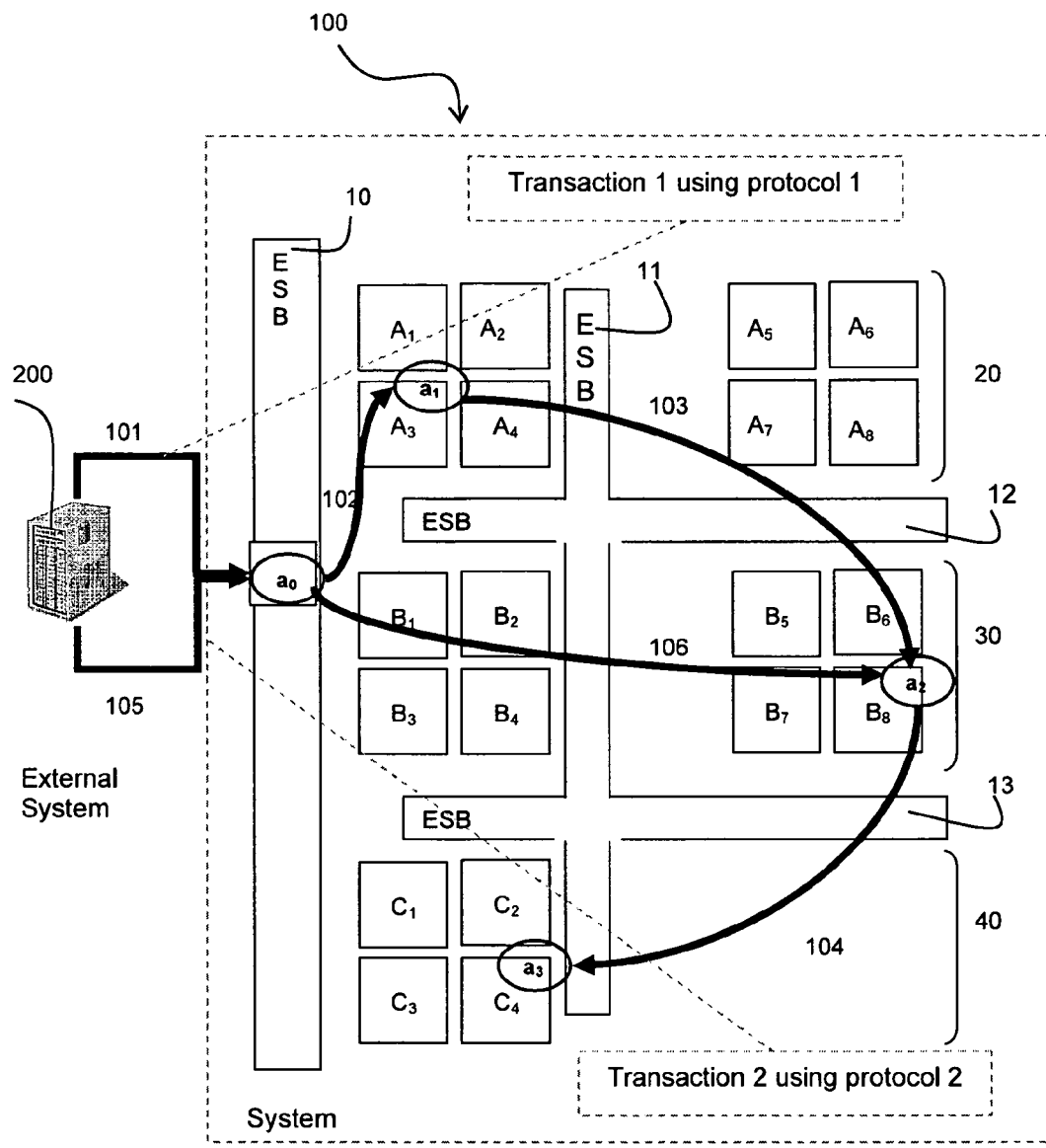
FIG. 1 depicts an example of a system according to an embodiment of the invention wherein an external device is provided with a session comprising conversations using different protocols.

Some advantageous features and steps will be described below. Then some exemplary embodiments and use cases will be further detailed in regard with the drawings.

The present invention discloses a method of providing an external device with a session, wherein the session requires establishing conversations between the external device and application servers of a system. The external device and the system operate in a client/server mode, the system operating in one mode among the client mode and the server mode, the external device operating in the other mode among the client mode and the server mode.

Each application server processes at least a software application, at least some of the application servers being arranged to store in data storage means at least a part of a context of the session, allowing thereby to distribute the context through various application servers linked to the session.

The system is provided with at least a routing means configured to establish, for a given session, a conversation between the external device and one of the application servers. Establishing the conversation comprises the following steps performed at the routing means with at least one data processor:

receiving a call from one among the application server and the external device to reach the other among the application server and the external device;

determining if the call comprises a session identifier (ID),

If the call does not comprise a session ID, then opening a session for said conversation, creating a session ID that uniquely identifies said session, adding the session ID to the call, storing the session ID and routing the call to the other among the application server and the external device, establishing thereby the conversation;

If the call already comprises a session ID, then routing the call to the other among the application server and the external device and allowing said conversation to join an already opened session that is uniquely identified by said session ID, thereby establishing the conversation and enabling the conversation to share the context of an already opened session.

Thus the invention enables a conversation to open and to uniquely identify a session and then to have another conversation that can join that session. These conversations can thus share the context of that session whatever is their protocol. The external device can therefore be provided with a unified and consistent view of the session comprising the joined conversations.

Providing the user with a unified view of the session means that the user does not notice that the various software applications are processed by various and independent application servers. Thus, the number of software applications and the application servers involved in the session is transparent to the user. The user interacts with the system as if it is one unique application server and machine.

Several transactions and conversations can share the same inbound session if the system operates in a server mode with the external device, or can share the same outbound conversation if the system operates in a client mode with the external device.

Additionally, although the external device is provided with a unified and consistent view of the session, additional application servers can be added to the system with few or no impact on pending sessions, increasing thereby the processing capacity of the system. In addition, although the external device is provided with a unified and consistent view of the session, additional software applications can be integrated to the system with few or no impact on pending sessions, integrating thereby new services.

Optionally, the method according to the invention may comprise any one of the additional but not limitative features and steps:

Preferably, each application server processes one single software application. Thus each application server is dedicated to one single software application.

The conversation to be established has a first session ID and uses a first protocol and at least another conversation has the same session ID and uses a second protocol.

Thus, according to a particularly advantageous but non limitative feature of the invention, all conversations whatever are the software application that they call can share the same session, whatever is their protocol. For instance, the external device can open a session with a first transaction that calls a first software application and uses a first communication protocol. Then the external device can call, through the same session, a second software application that uses a second communication protocol.

This feature of the invention is particularly advantageous for conducting gradually a migration from some software applications to other software applications using another protocol. Indeed, the invention allows integrating and processing new software applications while sharing the context of the previous software applications. Migration can therefore be conducted gradually which is much safer than conducting in one step a migration for all software applications.

Existing systems do not provide efficient solutions to conduct a gradual migration from applications using given protocols to applications using other protocols while sharing the same context.

Preferably, the routing means is an enterprise service bus.

The system comprises a plurality of routing means. For a given session one routing means among the plurality of routing means is a main routing means in charge of routing transactions between the external device and the system.

The step of allowing said conversation to join an already opened session that is uniquely identified by said session ID comprises the following steps performed at the routing means receiving the call:

polling the other routing means to know which one among the plurality of routing means is the main routing means for said already opened session and then, Forwarding the transaction to the main routing means.

Preferably, the routing means are at least an enterprise service bus (ESB). An ESB comprises a plurality of ESB component in charge of routing the transactions. A call reaching an ESB component with a request to join a session is forwarded to the ESB component in charge of that session through polling all. ESB components with the session ID of that session.

According to an embodiment of the invention, the external device operates in a client mode in regard with the system operating in a server mode.

The external device can be composed of several heterogeneous components accessing the system with heterogeneous protocols.

Thus, for such use case, the external device can provide a unified view of the session, even if using several conversations to access the server, as if only one conversation is used.

All the components of the external device having the same session ID will send transactions to the application server as if they were a single device using a single conversation.

According to another embodiment of the invention, the external device operates in a server mode in regard with the system operating in a client mode.

Thus, for such use case, the external device can be provided with a unified view of the session as if all conversations and transactions of that session and coming from the various application servers were coming from one single application server. Thus the invention alleviates the need of having a software application dedicated to merging queries from the system into a common outbound conversation with the external device.

All application servers receiving calls sharing the same session ID can share the same outbound conversation with the external device. More precisely, all conversations from application servers having the same session ID share a common portion of conversation, which is the outbound portion between the routing means and the external device.

According to another embodiment of the invention, the external device operates in a client mode in regard with the system operating in a server mode and an additional external device operates in a server mode in regard with the system operating in a client mode.

After the step of receiving a call at the routing means and before the step of determining if the call comprises a session identifier (ID), the method comprises an additional step of determining that the call requires joining an already opened session.

The step of determining that the call requires joining an already opened session comprises receiving a request to join an already opened session. The request to join an already opened session is referred to as implicit. Preferably, the request to join an already opened session is held in a session layer of the protocol of said call.

Alternatively, the step of determining that the call requires joining an already opened session comprises the following step: the routing means determines that the received call comes from or requires to be routed to an application server processing a software application dedicated to requests to join an already opened session, which indicates to the routing means that the received call must join an already opened session. The request to join an already opened session is referred to as explicit.

The explicit request to join an already opened session can be sent by an external device.

Alternatively, implicit request to join an already opened session can be sent by the system. Several application servers can therefore share a common outbound conversation with the external device.

Conversation Properties

Advantageously, a given conversation of a session is provided with a property that controls the closure of the session.

A property is configured to close the session upon closure of said given conversation. This property is referred to as a "be owner property"

Another property is configured to close the session upon closure of said given conversation and if no other conversation is still opened for that session and is configured to keep the session opened upon closure of said given conversation and if at least another conversation is still open for that session This property is referred to as a "simple share property".

Another property is configured to close the session after the end of a predetermined inactivity time period starting upon closure of said given conversation, and if no other conversation is still opened for that session. Then upon closure of the conversation, any new conversation can join the session. during a predetermined time period. This property is referred to as a "Keep on exit property".

Advantageously, upon closure of a session the routing means sends to all application servers sharing a conversation for that session a notification of session closure.

Preferably, a routing means in charge of the session keeps a reference of all application servers operating for that session. Thanks to these references, the routing means can inform the application servers that the session is closed.

Upon reception at an application server of the notification of session closure, then said application server closes the conversation(s) that it handles for that session.

If the application server is provided with data storage means configured to store a part of the session context, the method comprises an additional step of deleting said part of the session context upon reception of the notification of session closure. Therefore, the use of processing and storage capabilities is optimized.

According to a preferred embodiment, the application servers form groups of application servers dedicated to a software application, each application server of the same group processing independently the software application to which the group is dedicated, application servers storing a part of the context of a session defining thereby for each session a set of application servers having each an affinity with the user session, the method comprising the following steps:

at the routing means, assigning to the session a correlation record (DCX) arranged to comprise affinity keys, each affinity key indicating the application server that has an affinity with the session for a given software application, propagating the correlation record with the transaction, allowing thereby the routing means to target the application servers that are linked to the context of that session.

According to a non limitative embodiment, the session ID is stored in the correlation record.

All application servers are independent of each other. They do not know the existence or location of each other. Only the correlation record that is read by the routing means allows establishing a conversation between the software applications.

Thus, the affinity key is a reference added to the correlation record that allows the routing means to target the application server using the part of the context linked to the session that is relevant to process the transaction.

Advantageously, the session ID is stored along with the correlation record or is stored in the correlation record.

Thus, the session ID is propagated along with the Affinity Keys to all application servers involved in the session. The session ID of a given session can thereby be implicitly shared with all application servers holding the session context for that session.

The session IDs are created by the routing means. The one or more routing means know how to reach every single application servers. Thus, the one or more routing means know the presence of each application server and where that application server is located. The one or more routing means also knows on which application servers a given software application is processed. Preferably:

the correlation record is stored in data storage means associated to a routing means in charge of the session;

the main routing means is the routing means that receives the user request;

the affinity keys are set by the routing means.

Security Settings, Cloning of Security Context

According to a preferred embodiment, the external device operates in a client mode and the system operates in a server mode. The external device requests to open a new session while inheriting security settings from an already opened session.

Inheriting security settings comprises duplicating a part of the context of the already opened session, said part of context containing security settings of the already opened session.

The context of the new session is independent of the context of the already opened session excepted for the part of the context containing security settings. Requesting to open a new session while inheriting security settings from an already opened session, comprises the following steps performed at the routing means:

receiving from the external device a request to open a new session and a session ID identifying the already opened session, thanks to said session ID, retrieving the security settings of the already opened session, propagating said security settings with the conversation of the new session.

Therefore, various sessions can be opened, each having a dedicated applicative context, while sharing the same security settings. Only the part of the context that relates to security settings is duplicated. The remaining of the context is not duplicated.

Independence of each session is thus maintained while alleviating the need for performing an authentication for each session.

Therefore a high number of requests can be sent to the system while limiting the load of application servers dedicated to security controls and cumbersome authentications.

The invention also circumvents the need of processing queries by pools of conversations.

Preferably, security settings generated by a conversation of the already opened session are received and stored at the routing means in association with the session ID of that already opened session. Then, a conversation of a new session can provide the routing means with the session ID of the already opened session for retrieving the security settings of the latter, alleviating thereby the need of authenticating at each new session.

According to a preferred embodiment, all the sessions sharing the same security context are linked, so the external device can close all the sessions in one single request. Similarly, a remote security administrator can request closure of all sessions sharing the same security context in one request.

The request for sharing security context can be performed explicitly using a dedicated service call. Alternatively, it can be performed implicitly, through a request hold in a session layer of the protocol, allowing thereby sending parallel stateless queries to the system while using the same authentication.

In the context of the invention, an external device is a system such as a processing unit, a personal computer, a smart phone, a database equipped with a processing unit, a data store etc.

According to an embodiment, the external devices operate with the system in a client mode with the system that operates in a server mode. Thus, external devices can send queries to the system. Typically, this type of external device gathers personal computer of user, servers running websites etc. For instance such an external device is a website enabling users to book and purchase travel and tourism products and services. Typical products relate to flight, train, car rental or hotel. The external device can also be a system forming part of a reservation system and which sends queries related to travel availability (typically queries related flight availability).

According to another embodiment, the external devices operate in a server mode, the system operating in a client mode. Typical examples of such external devices are processing units or data stores that provide the system with data. For instance such an external device is a data store operated by a corporation providing travel and tourism products and services. The data store can be an inventory in charge of availability of flights and operated by an airline or by a global distribution system (GDS).

A conversation is a communication between two components, the components being an external device and an application server of the system or being two application servers of the system. Only one protocol is used per conversation.

A transaction comprises all conversations and processing that are required to fulfill a query. A call is initiated by any one of an external device or an application server to establish a conversation.

A session usually comprises a plurality of conversations and may comprise a plurality of transactions. A session is associated to a context. The context can be generated by the application servers and/or can be provided by an external device.

In the present invention, the user context also referred to as context is a context related to a user and relevant to process a session. It represents all the functional and technical information that are used by the system for this specific user to perform the requested functionalities, e.g. in the travel reservation system, the reservation (shopping) session context which is linked to an active end-session.

A part of the user context may be data provided by the user such as user personal references, a departure date, an origin or a destination. A part of the user context may be required by a software application linked to the storage means. The part of the user context may also be data generated by the software application. For instance, the part of the user context may relate to flight availability retrieved by the software application or to prices computed or retrieved by the software application. The part of the user context may also relate to a passenger name record (PNR) or a part of a PNR.

As illustrated on FIG. 1, the system comprises routing means 10, 11, 12, 13 configured to route transactions. Preferably, the routing means is an enterprise service bus. Alternatively, the routing means can also be a router or any other means able to route a transaction to an appropriate application server. In the following, the routing means will be referred to as ESBs, whatever is their nature: enterprise service bus, router etc.

For each user session, one ESB is in charge of the session. This ESB is referred to as the main ESB. Preferably, the main ESB is the ESB 10 that receives the request from the user. When the main ESB comprises several ESB components, for each session there is preferably one component that is in charge of said session. Said component is referred to as the main ESB component.

Preferably, the system comprises a plurality of machines. Each machine is a hardware device that comprises at least a processing means running at least an application server. At least some of the machines also comprise data storage means. At least an application server runs on a machine. The application server A1, A2, . . . C4 . . . , uses the processing means. At least some of the application servers also use the data storage means. Thus an application server is linked to processing means and eventually to data storage means.

According to a particular embodiment, a plurality of application servers runs on a single machine. Each application server may use its own processor means and eventually its own eventual data storage means. Alternatively, a plurality of application servers may share the same processor and eventually the same data storage means.

According to another embodiment, only one application server runs for a given machine. Thus, according to this other embodiment, routing a transaction to a machine will also mean routing a transaction to an application server in the description below.

Each application server processes a software application.

Advantageously, the same software application is independently processed by a plurality of application servers, these application servers running on the same machine or on different machines.

The system can also be referred to as a platform.

Application servers are organized into groups 20, 30, 40. Application servers are also referred to as machines.

Each application server of the same group of application servers processes the same software application.

Then a given software application can be processed in parallel on a number of application servers. For instance, each application server A1, A2, . . . , A8 of group 20 processes the software application A. Each application server B1, B2, . . . , B8 of group 30 processes the software application B. Each application server C1, C2, C3, C4 of group 40, processes the software application C.

For a given session there is only one application server that operates per software application. Thus, among a group of application servers that process the same software application, one application server is dedicated to that given session.

Each application server that needs to store data is provided with data storage means. The application server dedicated to a given session uses the storage means of the machine on which it runs. This application server dedicated to a given session can thus store in these storage means the part of the user context that is relevant for the software application processed by this application server.

Thus, the context of the user is distributed over a possible very large number of application servers, each part of the user context being stored locally. As depicted on FIG. 1, the context of user Ua comprises the parts a0, a1, a2, a3 and is distributed through the application servers A3, B8, C4. a0 is stored in the data storage of the main ESB. A0 contains the session ID referencing the user session and all the data related to the conversations opened with user and the application servers. Eventually, a0 also comprises a correlation record. The correlation record (DCX) will be further detail below.

Therefore, all application servers that are dedicated to a given user session form a set of application servers having each an affinity with that session.

A solution that allows heterogeneous conversations to share a common session will be now detailed.

External device 200 sends a call to system 100. ESB 10 receives the call (step 101). No previous conversation has been opened by external device 200 for that session. This call 101 does not comprise any session identifier (session ID). Then ESB 10 creates a session ID and stores the session ID. ESB 10 also routes the call to an application server that processes the software application called by the external device 200 (step 102). ESBs are configured to know which group of application servers processes the software application requested by external device 200.

Thus a conversation is established between external device 200 and application server $A_3$ that is dedicated to process software application. Application server $A_3$ processes the transaction. A part $a_1$ of context is created and stored in the data storage means associated to $A_3$. $A_3$ calls another software application (software application B). Such call is also referred as a collateral call. ESB 11 is in charge of routing calls coming from the group of application servers that are dedicated to process software application B.

ESB 11 selects, for instance through load balancing rules, application server B8 among the group 30 of application servers that are dedicated to process software application B and routes the transaction to B8 generating thereby a conversation between application servers A3 and B8 (step 103). Such conversation is also referred to as a collateral conversation. B8 processes the transaction and creates a part of context for that session. This part a2 of context is stored in data storage means provided with application server B8.

After processing, application server B8 calls software application C. ESB 13 in charge of routing calls from group 30 of application servers that are dedicated to process software application B selects application server $C_4$. The transaction is routed to application server $C_4$ (step 104). Application server $C_4$ processes the transaction and creates a part $a_3$ of the context for that session.

Thus the transaction comprises steps 101, 102, 103, 104.

Therefore, the session comprising all mentioned conversations has a context comprising parts $a_0$, $a_1$, $a_2$, $a_3$. Said context is distributed through a plurality of application servers.

External device 200 opens another conversation (step 105). Previously, external device 200 has retrieved the session ID created by the ESB 10.

External device also requests that this other conversation joins the session opened with the previous conversation.

Such request to join the already opened session can be explicit or implicit.

An explicit request means that external device 200 calls a software application dedicated to requests for join session.

ESB 10 identifies the software application that is called by external device 200 and determines that the new conversation of ESB 10 must share the already opened session.

An implicit request means that the call form ESB 10 comprises a header comprising a request for join session. More precisely, the session layer of the protocol of this new conversation holds a request for join session.

When ESB 10 determines that the new conversation is expected to join an already opened session, then the ID session of that new conversation is checked.

If ESB 10 holds an identical session ID, then it means that this ESB 10 is the ESB managing the already opened session. Then, ESB 10 allows the call from external device 200 to reach the required application server and to join the already opened session.

If ESB 10 does not hold an identical session ID, then it polls the other ESB or other components of ESB in order to identify which ESB or component of ESB is in charge of the already opened session having an identical session ID. Such ESB (or ESB component) in charge of a session is referred to as the main ESB (respectively main ESB component) for that session.

When the main ESB is identified, the ESB that received the call from external device 200 forwards the request to join the session to the main ESB. In the use case illustrated at FIG. 1, the main ESB is also the ESB that receives the second transaction from the external device 200.

Once the main ESB has received the request to join the session, then the new conversation shares the already opened session, and can therefore share the context of the already opened session.

A particularly advantageous use case of the invention relates to session wherein various conversations use different protocols. Thanks to the invention, each conversation whatever is its protocol can share the context of the other conversations.

For example, transaction 2 comprising conversations illustrated by steps 105, 106 can share the context of transaction 1 comprising conversations illustrated by steps 101, 102, 103 and 104.

Referring to FIG. 1, external device 200 requests to open a new conversation with another protocol while sharing the context of previous conversations.

As mentioned above these features of the invention are particularly advantageous to migrate services using a protocol to other services using another protocol.

The invention is not limited by the number of conversations joining a session. Additionally, the invention is not limited by the number of different protocols used by the various conversations joining a session.

Figure 2:
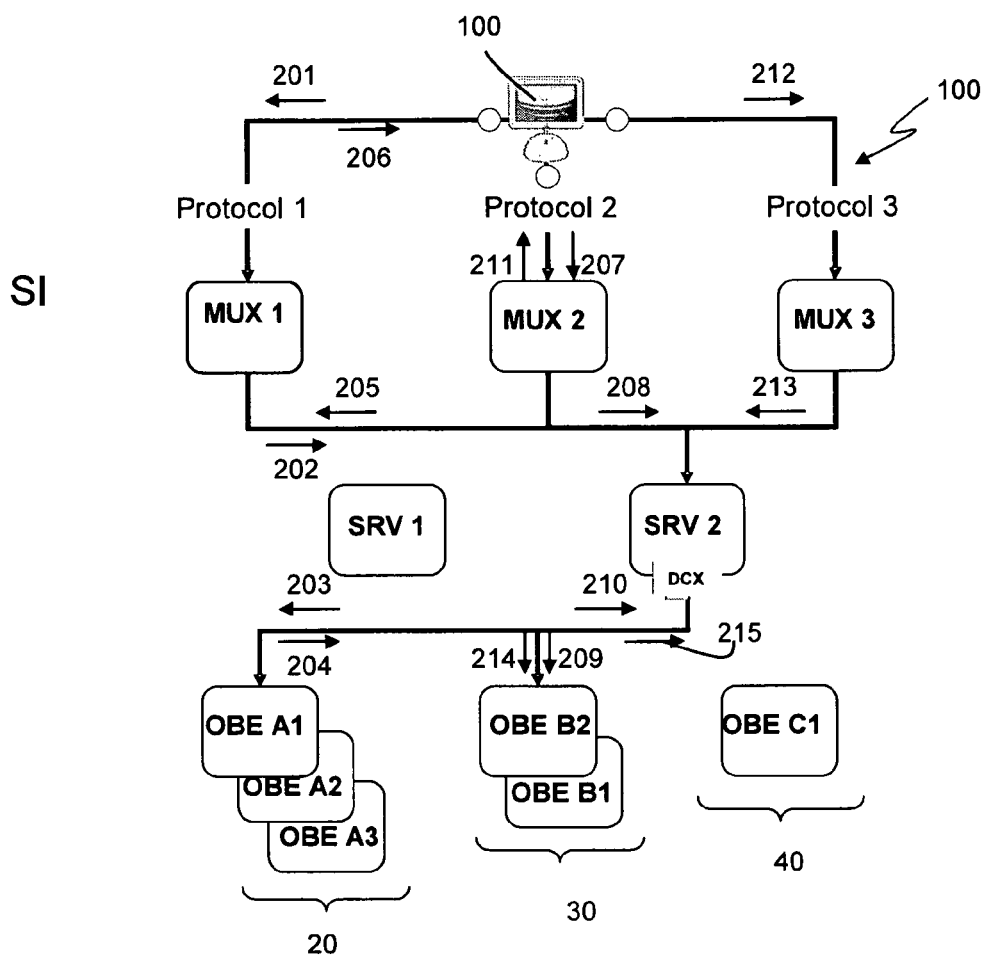
FIG. 2 depicts another example of system according to an embodiment of the invention system wherein an external device is provided with a session comprising conversations using different protocols.

FIG. 2 depicts another use case wherein the invention turns out to be particularly advantageous. In this embodiment, ESB are included in service integrator (SI). The SI comprises a plurality of multiplexers MUX 1, MUX 2, MUX 3 that are configured to receive calls from external devices such as external device 200 and from various application servers of the system 100. The SI also comprises servers such as SRV1 and SRV2 having each a function of routing means.

In this embodiment, application servers are referred to as open back ends (OBEs). OBEs are gathered into groups 20, 30, 40 of OBEs. Group 20 gathers OBE $A_1$, OBE $A_2$, OBE $A_3$ that each processes software application A. Group 30 comprises OBE $B_1$ and $B_2$ that each processes software application B. Group 40 comprising OBE $C_1$ that processes software application C.

External device 200 sends a call to SI that reaches MUX 1 (step 201). This call uses a protocol referred to as Protocol 1.

MUX 1 routes the call to SRV2 (step 202). As no session ID is comprised in this call, SRV2 opens a session and creates a session ID. Session ID is stored at SRV2. SRV2 determines that software application A is called and selects application server OBE $A_1$ among group 20. SRV2 creates a correlation record (DCX) that indicates that application server OBE $A_1$ is the application server that is linked to that session among application servers dedicated to process software application A. Such indication is referred to as an Affinity Key. Then, Affinity Key of the DCX indicates that OBE $A_1$ has an affinity with that session.

A general description and exemplary embodiments of the correlation record, its functionalities and its advantages are available in a co-pending patent application filed in the name of the Applicant of the present patent application, having the same priority date as the present patent application and entitled: "Method and System for providing a session involving a plurality of software applications".

SRV2 routes the call to OBE $A_1$ (step 203) establishing thereby a conversation between external device 200 and OBE $A_1$ through the SI. OBE $A_1$ processes the call. It eventually stores a part of the context of the session in the storage means that it uses.

Preferably, OBE $A_1$ creates a reference, referred to as the Applicative Context Key, which indicates how to retrieve the part of the context that it has stored. The Applicative Context Key is stored in the DCX. Therefore, next time OBE $A_1$ will receive a call for that session, it will be able to easily retrieve the part of the context that it holds for that session.

The DCX as enriched with the Applicative Context Key is returned back to SRV2 (step 204). SRV2 stores the DCX as enriched by OBE $A_1$.

Results of processing along with the DCX are sent to the external device 200 through MUX 1 (steps 205, 206). The session ID is also sent to the external device 200.

According to a specific and non limitative embodiment, the session ID may be stored in the DCX. Thus, as the DCX is propagated to each call and collateral call of each conversation, the session ID will also be propagated and cascaded. When external device 200 is provided with the results of the processing or with the DCX only, this first conversation ends.

Then, external device 200 opens another conversation using a protocol 2 (step 207).

This call contains the session ID retrieved from the first conversation and reaches MUX 2. MUX 2 is dedicated to calls using protocol 2.

This call contains a request to join already an opened conversation. MUX 2 polls all routing means (SRV1 and SRV2) with the session ID sent by external device 200. SRV2 identifies that it already holds an identical session ID. MUX 2 then forwards to SRV2 the request to join a session (step 208).

Then SRV2 allows this new call to share the already opened session. The context of the session is therefore available to the new conversation. SRV2 determines that an application server dedicated to software application B is called and selects one of these application servers as no request of affinity is set yet for that software application. OBE $B_2$ is selected. An affinity for that group 30 is set and the DCX is enriched with an Affinity Key pointing to OBE $B_2$.

The request of affinity is part of the ESB configuration. Based on a transaction parameters, such as the source, the destination and the software application of the transaction reaching an ESB, that ESB, thanks to its configuration is able to determine whether the transaction must be processed taking into account an affinity. Thus, static information (configuration of the ESB) is taken into account in order to determine whether an affinity is requested while. The content of the DCX is dynamic information.

The transaction is then routed to OBE $B_2$ (step 209). OBE $B_2$ processes the transaction. It stores a part of the context in the storage means of the machine on which it runs and enriches accordingly the DCX with an Applicative Context Key. DCX is returned back to SRV2 (step 210) where it is stored. Results of processing along with enriched DCX are routed to external device 200 (step 211).

A step 212, external device 200 requests to open another conversation using another protocol (protocol P3). MUX 3 is in charge of managing calls using protocol 3. ID of the session is included in the call and allows MUX 3 to forward the request for join session to SRV2 holding the same session ID and managing that session (step 213).

SRV2 then opens the session to this new conversation. Conversation using protocol 3 can thus share the context created by the conversations using protocol 1 and protocol 2.

Thus, SRV2 identifies that software application B is called. Thanks to the DCX, SRV2 determines that an affinity is requested for that software application and targets application server OBE B2. The transaction is then routed with the DCX to OBE $B_2$ and a conversation is opened between external device 200 and OBE $B_2$ (step 214). Applicative Context Key of the DCX allows OBE $B_2$ to retrieve the part of the context that its hold. OBE $B_2$ processes the transaction. Eventually, OBE $B_2$ updates the Applicative Context Key and sends back the transaction along with the DCX to SRV2 (step 215). SRV2 stores the DCX as enriched.

Results of processing performed by OBE $B_2$ along with the DCX are sent to external device 200.

This exemplary embodiment clearly illustrates that the invention allows conversations using different protocols to share the same context through sharing the same session.

This turns out to be particularly advantageous for migrating from a protocol to another while sharing the same context. Thus, migration can be conducted gradually, for instance service by service.

This use case also illustrates the advantages to propagate the correlation record along with the session ID while limiting traffic and routings.

Figure 3:
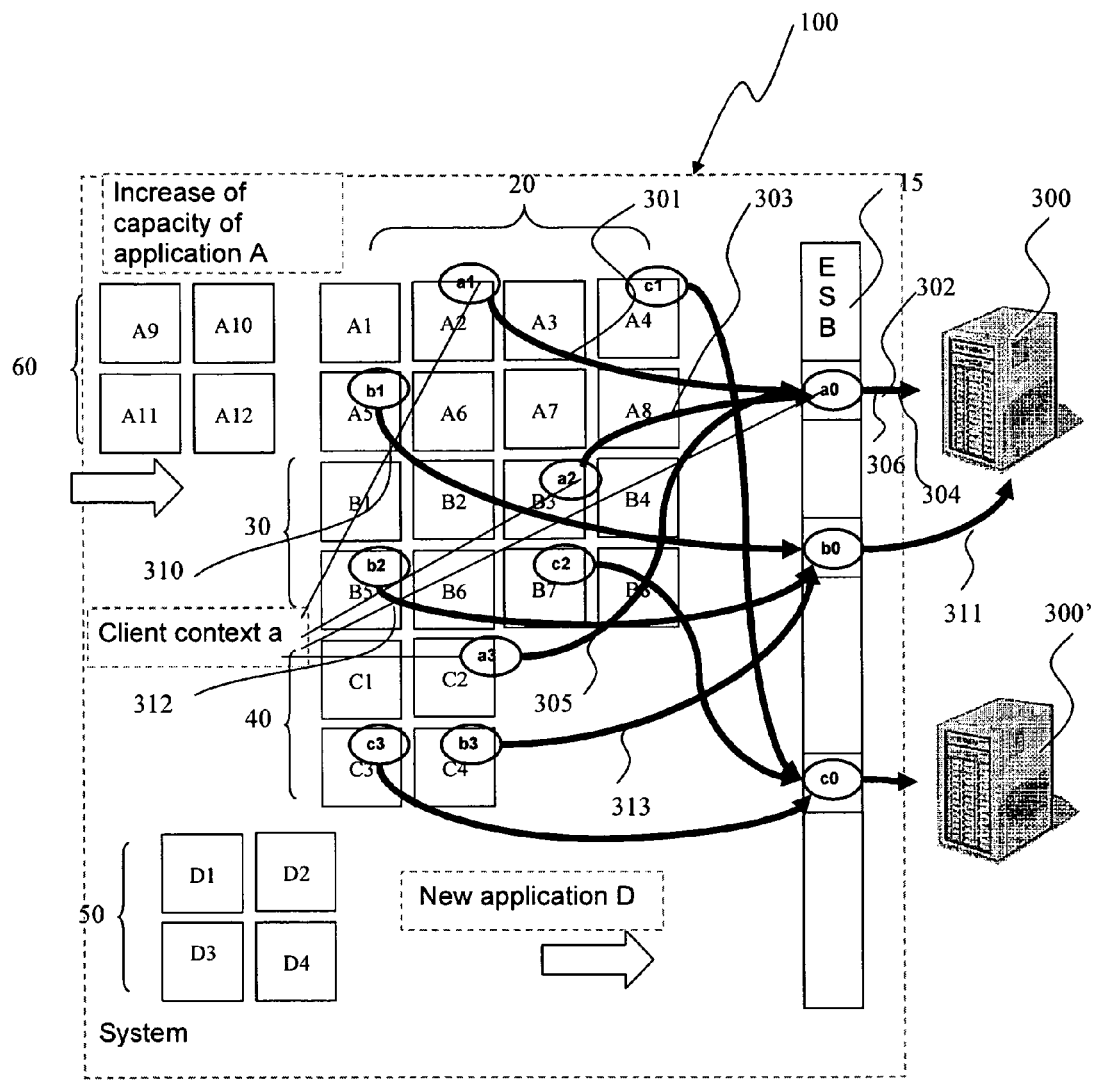
FIG. 3 shows an example of a system according to an embodiment of the invention wherein various application servers of the system share a common outbound conversation with an external device.

FIG. 3 illustrates other advantages of the invention. In this use case, the external device 300 operates in a server mode in regard with the system 100 operating in a client mode. For instance, the external device is a system hold by a provider of data while the system comprises application servers that need to retrieve and to process these data.

Although the system comprises a plurality of application servers, it interacts with the external device as if it comprises a single application server. ESB 15 receives a call from an application server $A_2$ of group 20 of application servers that are dedicated to process software application A (step 301). This call is intended to reach external device 300. As this call does not comprise session ID, ESB 15 opens a session and creates a session ID. This session ID uniquely identifies session a. ESB 15 stores said session ID and routes the call to external device 300 (step 302). A conversation is therefore opened between application server $A_2$ and external device 300. Responses from external device 300 are received at ESB 15 which routes said responses to the application server A2 having called external device 300. Session ID is also sent to this application server.

Then, another call reaches ESB 15 (step 303). This call comes from application server $B_3$. The call contains a request to join a session already opened and contains the session ID previously created by ESB 15. Said session ID has been propagated from application server $A_2$ to eventually other application servers or to another external device operating in a client mode with the system, before reaching application server $B_3$.

ESB 15 opens the session previously opened so that the call from $B_3$ can share the same outbound conversation with external device 300.

Similarly, a call from application server $C_2$ opens a conversation that share the previously opened session. $A_2, B_3$ and $C_2$ then share with external device 300 the same outbound conversation thanks to the session ID. Preferably, the session ID is stored in a DCX propagated to all application servers having an affinity with the context of session a. Preferably, the DCX is stored at the ESB in charge of managing said user session.

Similarly, another session (session b) is opened. $A_5, B_5, C_4$ share the same outbound conversation thanks to another session ID uniquely identifying session b. $A_5, B_5$ and $C_4$ respectively hold parts $b_1, b_2$ and $b_3$ of the context of user session b.

Similarly, user session c is opened. $A_4, B_7, C_3$ share the same outbound conversation toward external device 300' thanks to another session ID, uniquely identifying session c. $A_4, B_7, C_3$ respectively store parts c1, c2, c3 of the context of user session c. Therefore, external device 300' interacts with many application servers as if these application servers were a single application server.

The request to share a session can be explicit or implicit. As detailed previously, a call reaching an ESB component with a request to join a session is forwarded to the ESB component in charge of that session through polling all ESB components with the session ID of that session.

The use case depicted on FIG. 3 clearly illustrates that the system can share a common outbound conversation with an external device whatever are the originators of calls from system 100. Therefore external device interacts with system 100 as if all application servers were a single application server.

The context of the session can therefore be distributed without impacting the various external devices. This is very advantageous when the system is operated by a corporation that is different from the one operating the external device.

Additionally, the invention allows adding a group 60 of application servers to a group 20 of application servers with no impact on the external device. Processing capacity can therefore be easily increased. In addition, adding a group 50 of application servers D1, D2, D3, D4 dedicated to a new service D is totally transparent to the external device. The application servers of group 50 can run on the same machine or can each run on a dedicated machine. Thus the invention alleviates the need to change the initial system configuration. Enhanced services can therefore be offered to users (not illustrated on FIG. 3).

Advantageously, when joining a session, a conversation has a property that defines to which extent it controls the closure of the session. The three properties below allow managing efficiently the session, enabling for instance to optimize the use of storage capacity for that session.

When the conversation is set with a first property, the session closes upon closure of the conversation. This property is referred to as a "be owner property".

When the conversation is set with a second property, the session closes upon closure of the conversation and provided no other conversation is still opened for that session. If at least another conversation is still opened for that session and even if the conversation set with the second property closes, the session remains opened. This property is referred to as a "simple share property".

When the conversation is set with a third property, the conversation closes the session after the end of a predetermined time period starting upon closure of the conversation. Then upon closure of the conversation, any other conversation or any new conversation can join the session during a predetermined time period. This property is referred to as a "Keep on exit property".

Preferably, upon closure of a session the routing means sends to all application servers sharing a conversation with that session a notification of session closure. Then all application servers close their conversation opened for that session.

Preferably, a routing means in charge of the session keeps a reference of all application servers operating for that session. Thanks to these references, the routing means can inform the application servers that the session is closed.

Figure 4:
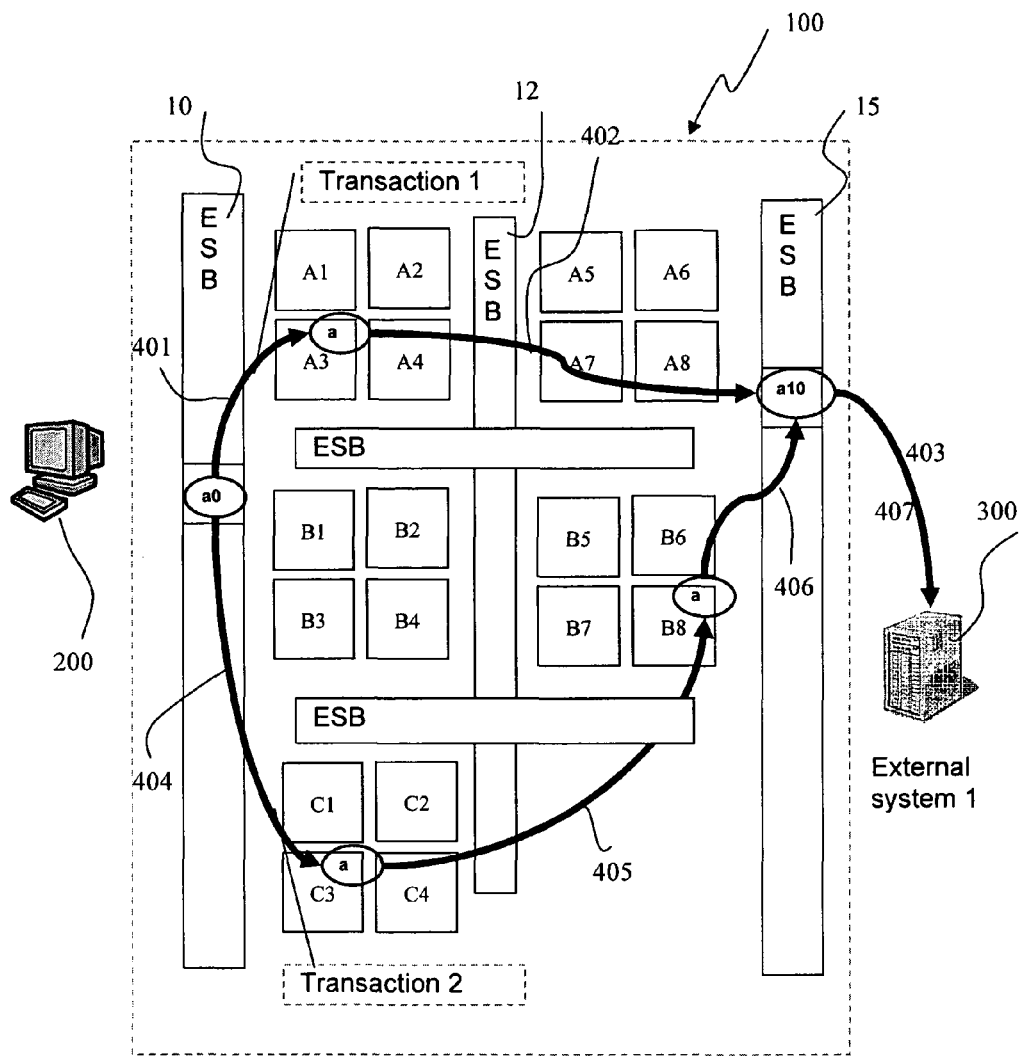
FIG. 4 depicts an example of a system according to an embodiment of the invention wherein an external device operates with the system in a client mode and wherein another application server operates with the system in a server mode while all conversations between the external devices and the system share a common context.

FIG. 4 depicts another exemplary use case of the invention wherein the system interacts with an external device 200 operating in a client mode with the system 100, while an external device 300 operates in a server mode with the system 100. A possibly high number of external devices 200 and a possibly high number of external devices 300 could interact with the system. This use case combines the features and advantages of previously described use cases of FIGS. 1, 2 and 3.

In particular, external device 200 can open a stateful transaction with external device 300 through some application servers of the system 100 (application server $A_3$ as as illustrated on FIG. 4). The transaction comprises the conversations 401, 402, 403.

External device 200 can open a subsequent transaction sharing the context of the previous transactions. The subsequent transaction comprises the conversations 404, 405, 406, 407.

Conversations 404, 405 are processed on different application servers than conversations 401, 402 of the previous transaction.

However, previous and subsequent transactions share the same stateful conversation (403, 407).

Thus, external device 300 interacts with all application servers as if they were a single application server. Previous and subsequent transactions could possibly use different protocols. The session ID propagated with each transaction allows sharing the context of the session comprising both transactions.

Other advantageous features of the invention will be now detailed with reference to FIG. 5. A conversation can request the creation of a new session and a new context for that session while inheriting security settings from the already opened session.

The new session, also referred to as the subsequent session or cloned session, has its own context excepted regarding the security settings and can therefore be considered as a session that is cloned from the session already opened.

This allows an external device to open several cloned sessions and then to have several applicative contexts while performing one authentication to the system. Thus, only a part of the context of the already opened session is duplicated to the cloned sessions. This part of context relates to security settings.

Preferably, all cloned sessions are linked to the previously opened session. Thus, all cloned sessions can be closed with one single request. All cloned sessions can be closed upon closure of the previous session. Alternatively, all cloned sessions can be closed on request of a security administrator.

As for join session, a request to open a cloned session can be performed explicitly through calling a dedicated software application or implicitly with a dedicated header embedded in the call.

Using implicit cloned sessions, an external device operating in a client mode in regard with the system operating in a server mode can send parallel stateless queries to the system while performing a single authentication.

With existing systems, parallel queries requiring each to have a dedicated context necessitate each to perform an authentication. Application servers dedicated to authentication are therefore massively called which leads to a low reliability or requires costly equipments. Other existing solutions are based on pools of conversations, one single authentication being required for a pool of conversations. Although these solutions alleviate the need to authenticate for each query, they require important changes in existing equipments.

Figure 5:
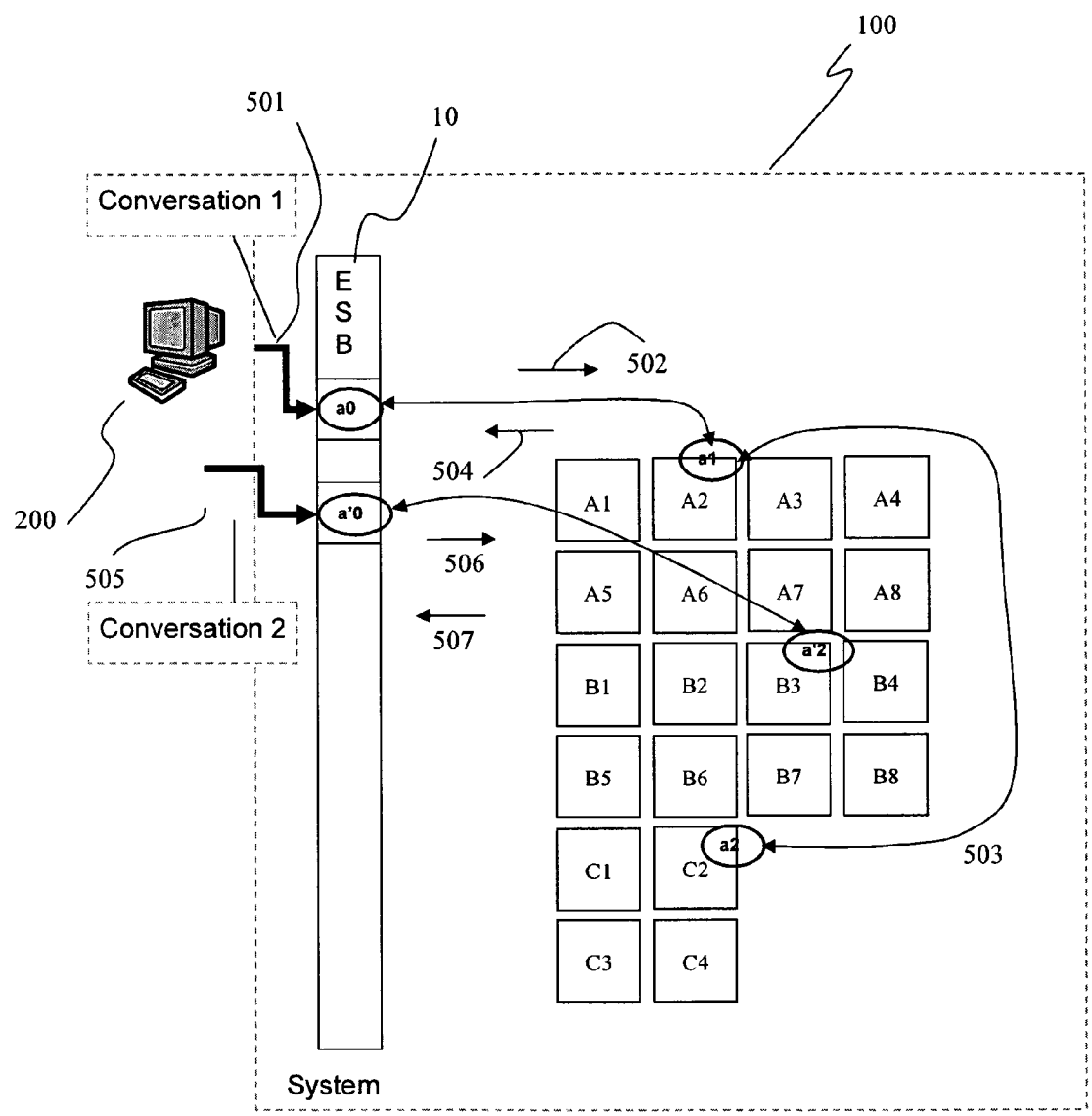
FIG. 5 shows an example of a system according to an embodiment of the invention wherein an external device inherits from a previous session security settings in view of using them for a subsequent session.

Referring to FIG. 5, external device 200 calls ESB 10 (step 501). ESB opens a session and creates a session ID. ESB routes the call to an application server $A_2$ in charge of security checkings (step 502). Application server $A_2$ processes the transaction and generates security credentials that are sent back to external device through ESB 10 (step 504). ESB 10 stores session ID and security settings. Eventually, application server $A_2$ calls another application server ($C_2$) creating another part of the context for that session (step 503).

External device 200 then sends another call to ESB 10. Typically, this call is another query that must be processed by system 100 (step 505).

The call contains the session ID of the session already opened. Additionally, the call contains a request to clone the session already opened. ESB 10 in charge of the previously opened session retrieves the security settings taking into account the session ID. The part $a_0$ of the context of the previous session and that contains the security settings are duplicated to form a part of the context $a_0'$ for the cloned session. Then transaction for that cloned session containing the security settings is routed to the relevant application server ($B_3$) (step 506). Said relevant application server is not an application server dedicated to generating security settings. However this relevant application checks whether the received transaction comprises required security settings.

Application server B3 can therefore process the transaction and enrich the context of the cloned session. Results of the processing are sent to the ESB and the query from external device 200 is fulfilled (step 507).

The cloned session therefore comprises its own context excepted $a_0'$ regarding the security settings i.e., the applicative context of the cloned session is independent of the one of the already opened session.

From the above description, it appears that the present invention provides a way to give a unique view of a fully distributed client application, all parts of the possibly distributed external device using the same outbound or inbound conversation with the system.

Additionally, the present invention provides a way to manage the same session from heterogeneous communication protocols. This eases the migration from a protocol to another or the integration of heterogeneous external devices.

It also provides a way to manage several context sessions and stateless parallel queries in a single security session.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent data structures and logic flows may be attempted by those skilled in the art. However, all such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

The invention claimed is:

1. A method of providing an external device with a session in a distributed computerized environment including a plurality of application servers, the method comprising:
   receiving a first call at a first routing device from one of the application servers or the external device with a request to establish a first conversation between the application server and the external device;
   opening the session for the first conversation;
   creating with a processor of the first routing device a session identifier that uniquely identifies the session;
   adding the session identifier using the processor of the first routing device to the first call;
   storing the session identifier in storage at the first routing device; and
   routing the call from the first routing device to the application server thereby establishing the first conversation.

2. The method of claim 1 wherein the external device operates in a client mode and the system operates in a server mode, and further comprising:
   receiving a request from the external device at the first routing device to open a new session; and
   inheriting security settings from the opened session.

3. The method of claim 2 wherein inheriting the security settings comprises:
   duplicating a part of a context of the opened session, the part of the context containing the security settings of the opened session as a context for the new session.

4. The method of claim 3 wherein receiving the request from the external device to open the new session comprises:
   receiving at the first routing device from the external device the session identifier for the already opened session;
   retrieving the security settings of the opened session based on the session identifier; and
   propagating the security settings with a conversation of the new session.

5. The method of claim 3 wherein the context of the new session is independent of the context of the opened session excepted for the security settings.

6. The method of claim 1 further comprising:
   receiving a second call from the external device at the first routing device with a request to establish a second conversation between one of the application servers and the external device; and
   allowing the second conversation to join the session that is identified by said session identifier through enabling the second conversation to share the session for the first conversation.

7. The method of claim 6 wherein the first conversation uses a first protocol, and the second conversation uses a second protocol different from the first protocol.

8. The method of claim 6 further comprising:
   retrieving the session identifier from the storage at the first routing device;
   communicating the session identifier from the first routing device to the external device; and
   sending a request from external device to the first routing device for the second conversation to join the session opened with the first conversation with the second call.

9. The method of claim 8 wherein allowing the second conversation to join the session comprises:
   in response to the request by the external device, allowing the second conversation to join the session via the first routing device.

10. The method of claim 1 further comprising:
    receiving a second call from the external device at a second routing device with a request to establish a second conversation between one of the application servers and the external device; and
    allowing the second conversation to join the session that is identified by said session identifier through enabling the second conversation to share the session for the first conversation.

11. The method of claim 10 further comprising:
    closing the first conversation; and
    keeping the session opened upon closure of the first conversation and if the second conversation is still open for the session.

12. The method of claim 10 further comprising:
    closing the first conversation; and
    closing the second conversation at an end of a predetermined inactivity time period starting upon closure of said first conversation.

13. The method of claim 10 further comprising:
    retrieving the session identifier from the storage at the first routing device;
    communicating the session identifier from the first routing device to the external device; and
    sending a request from external device to the second routing device for the second conversation to join the session opened with the first conversation with the second call.

14. The method of claim 10 wherein allowing the second conversation to join the session comprises:
    in response to the request by the external device, forwarding the request for the second conversation to join the session from the second routing device to the first routing device.

15. The method of claim 14 wherein allowing the second conversation to join the session further comprises:
    receiving the forwarded request at the first routing device; and
    in response to receiving the forwarded request, allowing the second conversation to join the session via the first routing device.

16. A non-transitory computer-readable medium that contains software program instructions, where execution of the software program instructions by at least one data processor results in performance of operations that comprise execution of the method of claim 1.

17. A system for providing an external device with a session in a distributed computerized environment, the system comprising:
    a plurality of application servers; and
    a first routing device configured to couple the external device with the application servers, the first routing device comprising a processor, storage, and program code configured to be executed by the processor to cause the processor to receive a first call from one of the application servers or the external device with a request to establish a first conversation between the application server and the external device, open the session for the first conversation, create with a processor of the routing device a session identifier that uniquely identifies the session, add the session identifier to the first call, store the session identifier in the storage, and route the first call to the application server thereby establishing the first conversation.

18. The system of claim 17 wherein the external device operates in a client mode and the application servers operate in a server mode.

19. The system of claim 18 wherein the session is an inbound session from the external device to the routing device.

20. The system of claim 17 wherein the external device operates in a server mode and the application servers operate in a client mode.

21. The system of claim 20 wherein the session is an outbound session from the routing device to the external device.

22. The system of claim 17 further comprising program code configured to be executed by the processor of the first routing device to cause the processor to receive a second call from the external device at the first routing device with a request to establish a second conversation between one of the application servers and the external device, and allow the second conversation to join the session that is identified by said session identifier through enabling the second conversation to share the session for the first conversation.

23. The system of claim 22 wherein the request to establish the second conversation is held in a session layer of the protocol of the second call.

24. The system of claim 17 further comprising:

a second routing device configured to couple the external device with the application servers, the second routing device comprising a processor and program code configured to be executed by the processor to cause the processor to receive a second call from the external device with a request to establish a second conversation between one of the application servers and the external device, and to allow the second conversation to join the session that is identified by said session identifier through enabling the second conversation to share the session for the first conversation.

* * * * *